(12) United States Patent
Mjelstad et al.

(10) Patent No.: US 7,604,435 B2
(45) Date of Patent: *Oct. 20, 2009

(54) UMBILICAL WITHOUT LAY UP ANGLE

(75) Inventors: Einar Mjelstad, Fredrikstad (NO); Knut Ivar Ekeberg, Finnstadjordet (NO)

(73) Assignee: Nexans, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 11/343,261

(22) Filed: Jan. 30, 2006

(65) Prior Publication Data

US 2006/0193698 A1 Aug. 31, 2006

(30) Foreign Application Priority Data

Feb. 11, 2005 (NO) .................................. 20050773

(51) Int. Cl.
*H01B 7/00* (2006.01)

(52) U.S. Cl. ................................ 405/195.1; 174/113 C; 405/211

(58) Field of Classification Search .............. 405/195.1, 405/211, 212, 213, 215, 216; 166/367; 174/113 R, 174/113 C See application file for complete search history.

(56) References Cited

U.S. PATENT DOCUMENTS

| 3,705,432 | A | * | 12/1972 | Watkins, Jr. ................. 441/133 |
| 3,729,756 | A | * | 5/1973 | Cook et al. .................. 441/133 |
| 4,021,589 | A | * | 5/1977 | Copley ......................... 428/68 |
| 4,422,889 | A | * | 12/1983 | Trezeguet et al. ............. 156/70 |
| 4,477,207 | A | * | 10/1984 | Johnson .................... 405/195.1 |
| 4,744,842 | A | * | 5/1988 | Webster et al. ................ 156/78 |
| 5,330,294 | A | * | 7/1994 | Guesnon ................... 405/224.2 |
| 6,058,979 | A | * | 5/2000 | Watkins ....................... 138/149 |
| 6,155,748 | A | * | 12/2000 | Allen et al. ............... 405/195.1 |
| 6,213,157 | B1 | * | 4/2001 | Thiebaud et al. ............. 138/149 |
| 6,239,363 | B1 | * | 5/2001 | Wooters ....................... 174/47 |
| 6,639,152 | B2 | * | 10/2003 | Glew et al. .............. 174/113 C |
| 6,748,147 | B2 | * | 6/2004 | Quinn et al. ................. 385/110 |
| 6,943,300 | B2 | * | 9/2005 | Ekeberg et al. .......... 174/113 R |
| 7,070,360 | B2 | * | 7/2006 | Ellingsen .................... 405/157 |
| 7,070,361 | B2 | * | 7/2006 | McMillan et al. ........... 405/211 |
| 7,100,694 | B2 | * | 9/2006 | Legras et al. ................ 166/350 |
| 2002/0142683 | A1 | * | 10/2002 | Campbell et al. ............ 441/133 |
| 2004/0062612 | A1 | * | 4/2004 | van Belkom et al. ........ 405/211 |
| 2006/0137880 | A1 | * | 6/2006 | Figenschou et al. ......... 166/367 |

FOREIGN PATENT DOCUMENTS

GB 2178506 2/1987
NO 168674 11/1984

OTHER PUBLICATIONS

Norwegian Search Report—Sep. 8, 2005.

* cited by examiner

*Primary Examiner*—Tara Mayo-Pinnock
(74) *Attorney, Agent, or Firm*—Sofer & Haroun, LLP

(57) ABSTRACT

Umbilical device, where the device has a longitudinal axis (x), and includes at least one elongated electrical cable or tube element; and an elongated load bearing component along the longitudinal axis (x) and having an external surface including at least one groove disposed along the longitudinal axis (x) and parallel thereof. The component includes a central core encompassed by a plastic or elastic layer, which is provided with the at least one groove, where the groove is designed for holding the cable or tube element within it, while allowing the cable or tube element to move substantially radially in the groove when the umbilical is bent and that the layer is made from several plastic or elastic elements.

10 Claims, 2 Drawing Sheets

UMBILICAL WITHOUT LAY UP ANGLE

RELATED APPLICATION

This application is related to and claims the benefit of priority from Norwegian Patent Application No. 2005 0773, filed on Feb. 11, 2005, the entirety of which is incorporated herein by reference.

FIELD OF THE INVENTION

The present invention relates to an umbilical device and a method for manufacturing an umbilical device.

BACKGROUND

The umbilical is a composite structure capable of transporting hydraulic fluids, chemicals, electrical and optical signals and electric power. The conduit for chemical transport is usually placed in the center, while those for electrical signals and power and the hydraulic pipes are placed peripherally around the central element or core element. The peripherally situated elements are usually wound into a helix around the central pipe. Each element is free to move longitudinally in relation to the other elements.

From EP 0 627 027 B1 there is known a method for manufacturing and laying a plurality of elongate elements into an umbilical comprising a core element, a plurality of conduits and/or cables situated outside the core element, filler material around and between the conduits/cables and optionally a protective sheath surrounding the cables/conduits and filler material, which core element is advanced along a feed line and the conduits and/or cables are fed onto the outside of the core element and laid in a helix. The known lay-up machine used in this method is very complex and cannot be used on-site at the installation area, which normally is a platform in the sea.

GB 1 387 180 discloses a hollow cable comprising a tubular support of flexible homogenuous material, high tensile stringers disposed on the external surface of and immediately adjacent the support, and electric conductors disposed parallel to the stringers and in a common layer therewith the electrical conductors having approximately the same transverse dimensions as the stringers. The electrical conductors and the stringers are assembled around the support so as to make a very small angle with the longitudinal axis of the tubular support. A retaining layer is disposed over the stringers and electrical conductors. In one embodiment the support is formed with spacer ribs which extend parallel to the longitudinal axis of the support thereby providing longitudinal grooves to take up the electrical conductors and stringers. The retaining layer prevents the electrical conductors and the stringers from going out from the grooves.

GB 2 178 506 discloses an umbilical device having a longitudinal axis, and comprising at least one elongated electrical cable and/or tube element and an elongated load bearing component along said longitudinal axis and having an external surface including at least one groove disposed along said longitudinal axis and parallel thereof, said component including a central core encompassed by a plastic or elastic layer, which is provided with said at least one groove,

OBJECT AND SUMMARY

The object of the present invention is to provide an umbilical device without lay up angle suitable for service in a high mechanical load environment by way of example, hanging freely from the sea surface and down to the seabed, in ultra deep water oil field. An easy installation of ultra long umbilicals up to 200 km shall be made possible.

By means of the present invention there is obtained an improved umbilical device which can be produced at the site of installation. Thereby the use of complex devices for manufacturing umbilicals is not necessary.

The purpose of dividing the layer into a number of elements—each having at least one groove—is to avoid having to provide a complete extruded layer on site. By dividing the layer into several elements, these elements may be transported separately to the site and installed on the centre core together with the cables/tubes. All elements will be held together with an external tape layer,

BRIEF DESCRIPTION OF THE DRAWINGS

Above mentioned and other objects and features of the invention will clearly appear from the following detailed description of umbilicals taken in conjunction with the drawings, where FIG. 1 schematically shows a view of a first embodiment of a part of an umbilical.

DETAILED DESCRIPTION

Figure 1:
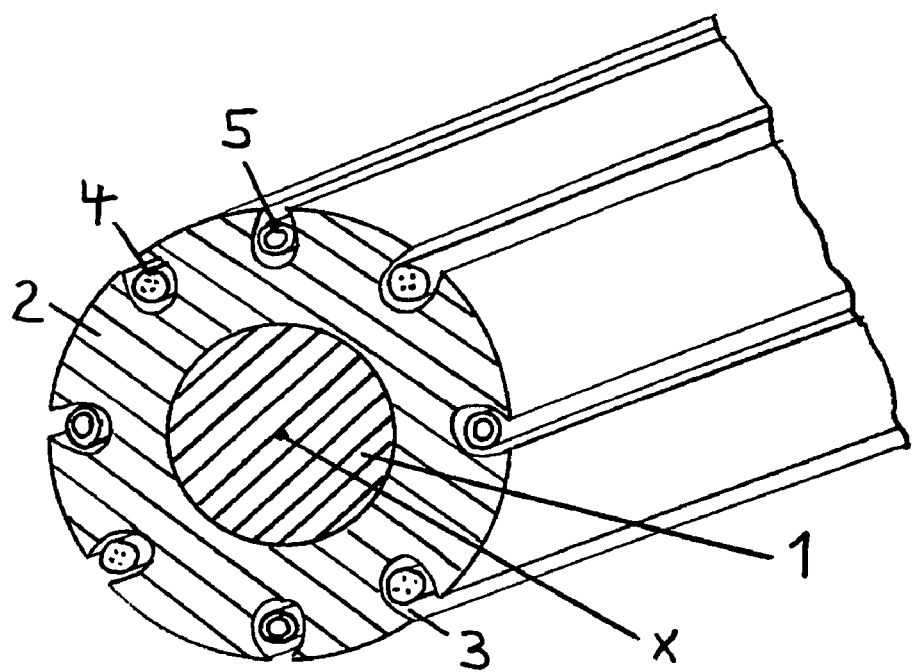
Figure 4A:
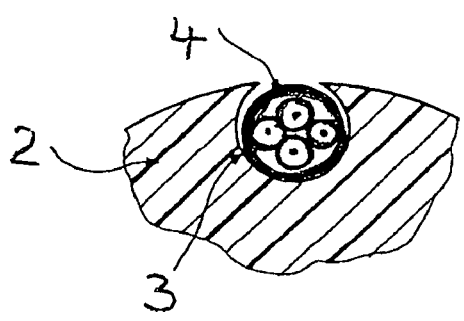
FIGS. 4a and 4b schematically show different grooves.
Figure 4B:
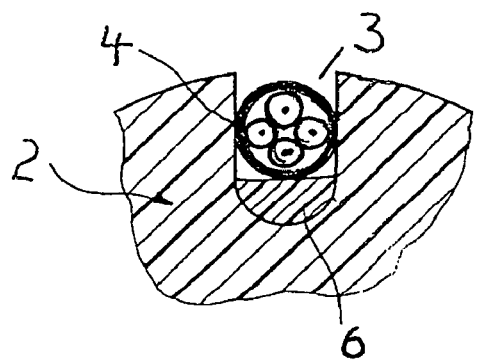

Referring to FIG. 1 the umbilical device includes a center core 1 which may be an electrical power cable, a strength member or a metal tube. The center core 1 is provided with a layer 2 of a plastic or elastic polymeric material. The layer 2 is preferably an extruded layer. The layer 2 consists in a preferred embodiment of cross-linked polyethylene or an elastomer such as EPDM. The layer 2 has a thermally insulating function. The layer 2 includes on its surface several grooves 3, which have an oval cross section, although other cross sections are possible as shown in FIGS. 4a and 4b. The grooves 3 are substantially in parallel with the axis X of the umbilical. Electric cables 4 and metallic tubes 5 are inserted in the grooves 3. Due to the cross section of the grooves 3, the diameter of the cables 4 and tubes 5 and the elastic properties of the material of the layer 2, the cables 4 and tubes 5 are free to move sideways and radially in the grooves 3 towards or away from the axis X, when the umbilical device is moved or bent in various directions. Due to the elasticity of the material of the layer 2 the cables 4 and tubes 5 can be easily inserted in the grooves 3.

Figure 3:
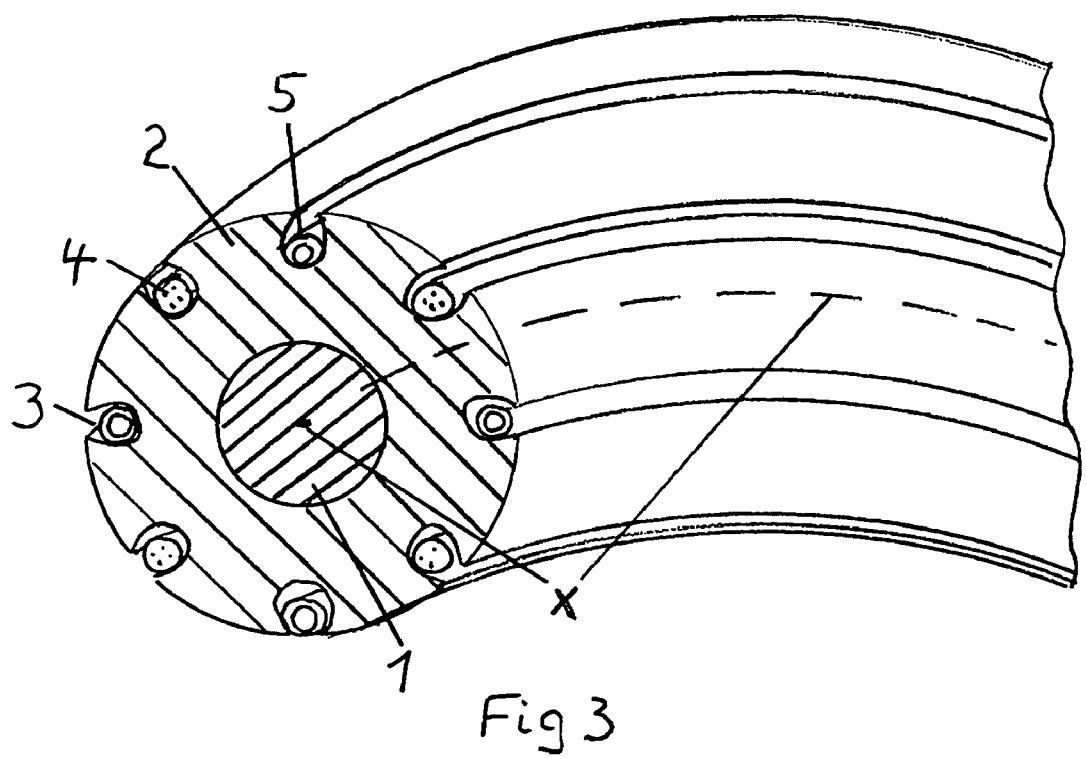
FIG. 3 schematically shows a view of the umbilical of FIG. 1 in a bent status.

The grooves 3 are shaped in a way that causes the cables 4 and tubes 5 to be able to displace towards the center of the umbilical if located on the outside of an umbilical bend and away from the center of the umbilical if located on the inside of an umbilical bend. This is shown in FIG. 3.

The grooves 3 are adapted in size or cross section to the cables 4 and tubes 5 so that the mass and inertia forces of the cables 4 and tubes 5 will be transferred to the layer 2 along the length of the umbilical.

Figure 2:
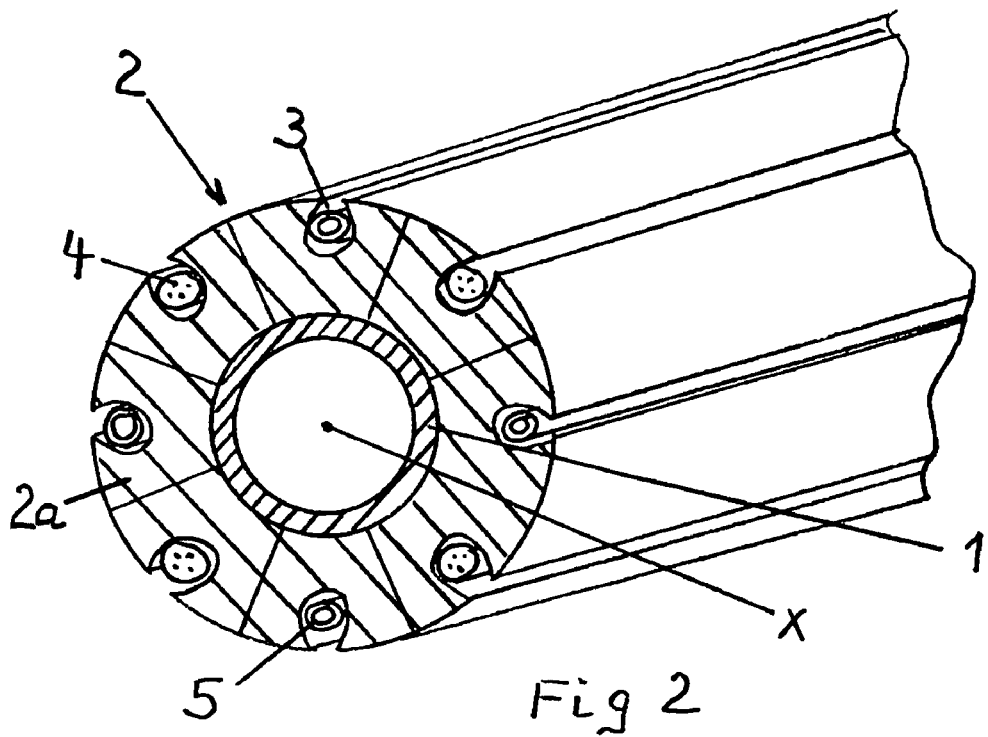
FIG. 2 schematically shows a view of a second embodiment of a part of an umbilical.

FIG. 2 shows a modified umbilical in which the center core 1 is a metal tube. The layer 2 is composed of several elements 2a which are made of the same material as the layer 2 of FIG. 1. The elements 2a may have the same cross section. The elements 2a are by preference made by extrusion.

The cables 4 and tubes 5 may be inserted in the grooves 3 either before or after laying the elements 2a to the surface of the center core 1.

The umbilicals as shown in FIGS. 1, 2 and 3 can be provided with at least one layer (not shown) which forms the outer sheath of the umbilical.

FIG. 4a shows a section of the layer 2 with a groove 3 which has a nearly circular cross section. Due to the fact that the material for the layer 2 is elastic, the cable 4 can easily be brought into the groove 3, although the opening of the groove 3 is smaller than the diameter of the cable 4.

FIG. 4b shows a groove 3 with a nearly rectangular cross section. On the bottom of the groove 3 there is provided an element 6 of a deformable material. The element 6 may be made of a foam-like material or of an elastic material. The element 6 is put into the groove 3 before laying the cable 4 into the groove 3.

The main advantage of the umbilical device according to the invention is that the umbilical can be completed at the site of the installation, which is by example a platform in the sea.

The center cores 1 and the cables 4 and tubes 5 are transported separately to the site.

When the center core is a metal tube as show in FIG. 2 the single metal tubes are welded together to form a tube of great length.

The cables 4 and tubes 5 are drawn-off from reels and laid into the grooves 3. If the layer 2 consists of several elements 2a these elements 2a (either with or without the cables 4 or tubes 5 in the grooves 3) are laid to the surface of the center core 1. The elements 2a are fixed to the center core 1 with a tape layer.

The invention claimed is:

1. An umbilical device, wherein said device has a longitudinal axis (x), and comprises:
at least two elongated electrical cable or tube elements; and
an elongated load bearing component along said longitudinal axis (x) and having an external surface including at least two grooves disposed along said longitudinal axis (x) and parallel thereof, said component including a central core made from at least one electrical power cable encompassed by a plastic or elastic layer, which is provided with said at least two grooves, wherein said grooves are designed for holding said cable or tube elements within them, while allowing said cable or tube elements to move substantially radially in said grooves when said umbilical is bent and that said layer is made from several radial plastic or elastic elements each element being laid to the surface of said central core where each said element is provided within at least one of said grooves and has a circumferential width being a fraction of the total circumferential width of said umbilical device, each element having substantially the same cross-sectional shape and dimensions as the other elements, and wherein said groove is adapted in size to the cable or tube elements so that the mass and inertia forces of said cable or tube elements are continuously transferred to the layer along the length of the cable or tube element.

2. The umbilical according to claim 1, wherein the device includes a central core encompassed by a plastic or elastic layer, which is provided with said at least one groove.

3. The umbilical device according to claim 1, wherein the layer is an extruded layer.

4. The umbilical device according to claim 1, wherein the layer is made from crosslinked or thermoplastic polymer or an elastomer.

5. The umbilical device according to claim 1, wherein the core is made from a metal tube.

6. The umbilical device according to claim 1, wherein the layer includes a plurality of grooves.

7. The umbilical device according to claim 1, wherein the groove is adapted in size to the cable or tube elements such that said cable or tube elements can slide radially or sideways in the groove, and said cable or tube elements are simultaneously sustained within said groove in such a manner to transfer mass and inertia forces.

8. An umbilical device, wherein said device has a longitudinal axis (x), and comprises:
at least two elongated electrical cable or tube elements; and
an elongated load bearing component along said longitudinal axis (x) and having an external surface including at least one groove disposed along said longitudinal axis (x) and parallel thereof, said component including a central core is made from at least one electrical power cable encompassed by a plastic or elastic layer, which is provided with said at least two grooves, wherein said grooves are designed for holding said cable or tube element within them, while allowing said cable or tube elements to move substantially radially in said grooves when said umbilical is bent and that said layer is made from several radial plastic or elastic elements each element being laid to the surface of said central core where each said element is provided within at least one of said grooves and has a circumferential width being a fraction of the total circumferential width of said umbilical device, each element having substantially the same cross-sectional shape and dimensions as the other elements, and wherein said grooves have an oval cross section so that the cable or tube elements are free to move sideways in the grooves towards and away from said longitudinal axis (x) of the umbilical device when the umbilical device is moved or bent in various directions.

9. An umbilical device, wherein said device has a longitudinal axis (x), and comprises:
at least two elongated electrical cable or tube elements; and
an elongated load bearing component along said longitudinal axis (x) and having an external surface including at least two grooves disposed along said longitudinal axis (x) and parallel thereof said component including a central core made from at least one electrical power cable encompassed by a plastic or elastic layer, which is provided with said at least two grooves, wherein said grooves are designed for holding said cable or tube elements within them, while allowing said cable or tube element to move substantially radially in said grooves when said umbilical is bent and that said layer is made from several radial plastic or elastic elements each element being laid to the surface of said central core where each said element is provided within at least one of said grooves and has a circumferential width being a fraction of the total circumferential width of said umbilical device, each element having substantially the same cross-sectional shape and dimensions as the other elements, and wherein said grooves are shaped in a way that causes the cable or tube elements to displace towards said longitudinal axis (x) of the umbilical if located on the outside of the umbilical bend and away from said longitudinal axis (x) if located on the inside of the umbilical bend.

10. An umbilical device, wherein said device has a longitudinal axis (x), and comprises:
at least two elongated electrical cable or tube elements; and an elongated load bearing component along said longitudinal axis (x) and having an external surface including at least two grooves disposed along said longitudinal axis (x) and parallel thereof, said component including a central core made from at least one electrical power cable encompassed by a plastic or elastic layer, which is provided with said at least two grooves, wherein said grooves are designed for holding said cable or tube elements within them, while allowing said cable or tube element to move substantially radially in said grooves when said umbilical is bent and that said layer is made from several radial plastic or elastic elements each element being laid to the surface of said central core where each said element is provided within at least one of said grooves and has a circumferential width being a fraction of the total circumferential width of said umbilical device, each element having substantially the same cross-sectional shape and dimensions as the other elements, and wherein said grooves are designed for holding both said cable and said tube elements within them.

* * * * *